Jan. 7, 1958 H. L. CROUCH 2,818,671
FISH-ACTUATED, HOOK AND LINE JERKING FLOAT
Filed April 10, 1953
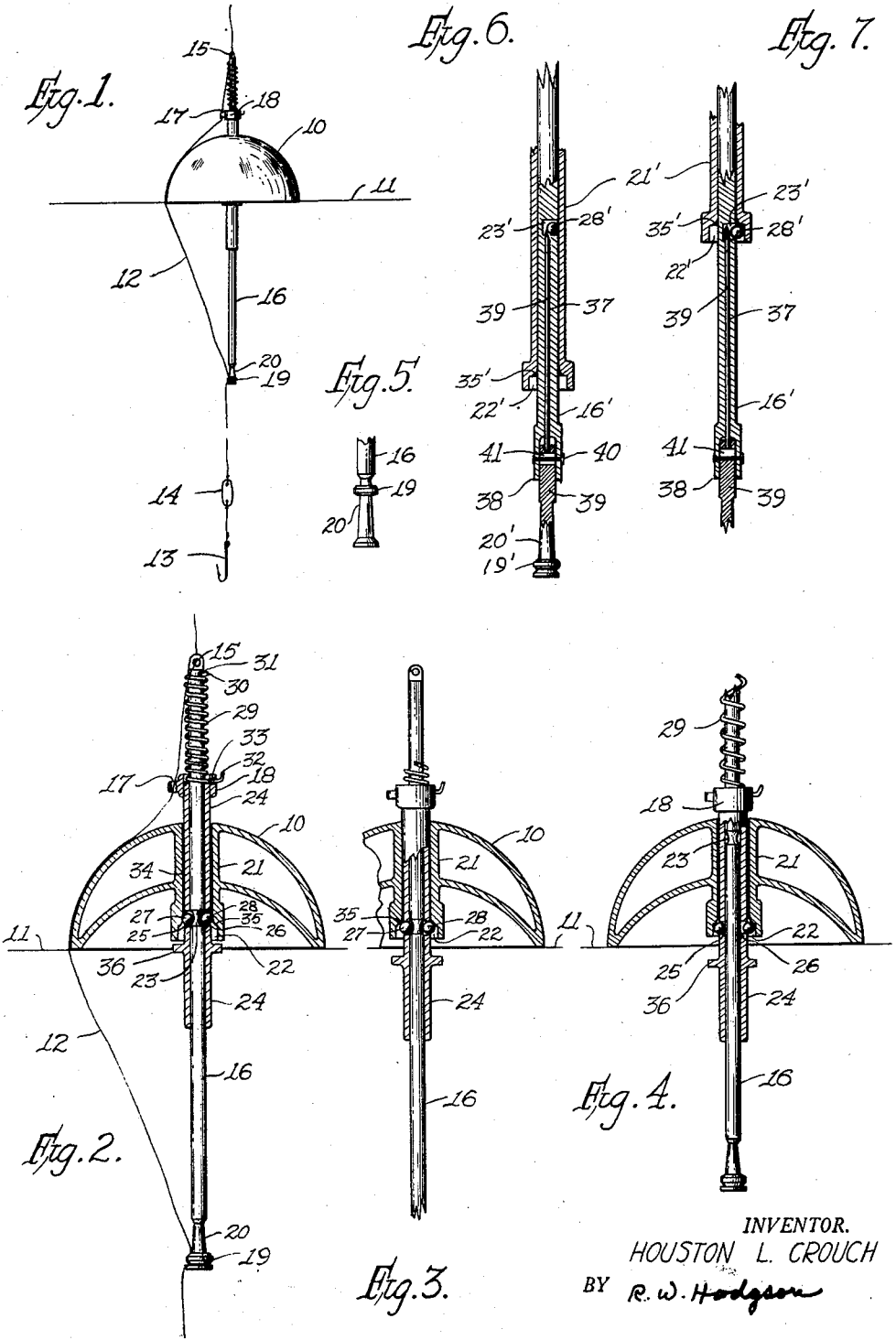
INVENTOR.
HOUSTON L. CROUCH
BY R. W. Hodgson 2,818,671
Patented Jan. 7, 1958

2,818,671

FISH-ACTUATED, HOOK AND LINE JERKING FLOAT

Houston L. Crouch, Los Angeles, Calif.

Application April 10, 1953, Serial No. 348,007

5 Claims. (Cl. 43—15)

This invention relates generally to fishing float apparatus and, more particularly, to a new and improved fish-actuated, hook and line jerking fishing float for use with a fishing line and hook.

The present invention consists of telescoping members provided with spring means cooperably related between the telescoping members to give the necessary jerking force, each of the members having one or more lateral recesses, and laterally switchable pin means in selectively insertable relation to the lateral recesses whereby the telescoping members may be slidably locked with the spring compressed and then released by a slight force operating to switch the pin means out of one of the lateral recesses.

It is an object of this invention to provide a fishing float with a means for firmly locking a motive power means in an easily releasable manner whereby a nibbling fish will release the motive power.

Referring to the drawing:

Fig. 1 is an elevational view of one preferred fully cocked embodiment of this invention provided with a fishing line and hook.

Fig. 2 is an enlarged, elevational, partially sectional view of the apparatus shown in Fig. 1, also fully cocked.

Fig. 3 is a fragmentary view similar in aspect to Fig. 2, but with the locking pins about to be released.

Fig. 4 is a fragmentary view similar in aspect to Figs. 2 and 3, but with the locking pins released and the spring in its extended, unbiased position.

Fig. 5 is an elevational fragmentary view of the lower end of the apparatus, showing the line-holding ring in its loose position.

Fig. 6 is an elevational, fragmentary partially sectional view of a modified embodiment of this invention with certain parts omitted for greater clarity, and with the telescoping members shown in the released position.

Fig. 7 is a view similar in aspect to Fig. 6, with the telescoping members shown in locked position.

As shown in Fig. 1, a buoyant member 10, such as a cork or a hollow shell, of plastic or other suitable material, is resting upon the water 11. A fishing line 12 is provided with a hook 13 and a sinker 14, and is threaded through an eyelet 15 at the top end of the plunger 16 and through another eyelet 17 which is an integral part of the sleeve 18. The line 12 is secured to the plunger 16 by means of a ring 19 which is separate from and slidably movable upon the plunger 16 so that the ring 19 may be moved up the conical reduced diameter portion 20 of the plunger and the line 12 inserted between the ring 19 and said conical portion 20, the ring 19 then being forced down upon the conical portion 20 until the line is tightly held by the ring and the plunger, as shown. This makes it possible to cast the device without setting it off—just as long as the line 12 is taut. The device will not be capable of being readily set off until after the line 12 is loosened from the fishing pole end thereof. In Fig. 5, the ring 19 is seen in its upper position upon the conical portion 20.

Fig. 2 shows the apparatus in greater detail. The buoyant member 10 is provided with a tube 21 having an annular internal recess 22. The plunger 16 extends through the tube 21 and has lateral recess means in the form of a circumferential groove 23. A pipe 24 is fitted in slidably movable relation between the tube 21 and the plunger 16, and is provided with lateral recess means in the form of two lateral opposed holes 25 and 26 extending through the walls of the pipe 24, the holes 25 and 26 having substantially the same height as the circumferential groove 23 of the plunger 16. Locking pin means in the form of two spherical balls 27 and 28 are located within the holes 25 and 26, respectively, and also extend into the circumferential groove 23 of the plunger 16, thereby operating as locking pins to prevent sliding movement of the plunger 16 with respect to the pipe 24, as will be explained more fully later. The sleeve 18 is secured to the pipe 24 at the top thereof. A coil spring 29 encompasses the top exposed portion of the plunger 16 and is connected to the plunger by insertion of the top end 30 of the spring 29 into a hole 31 in the plunger 16, and is effectively connected to the pipe 24 by insertion of the bottom end 32 of the spring 29 into a hole 33 in the sleeve 18. Thus, downward movement of the plunger 16 relative to the pipe 24 results in compression of the spring 29.

As seen in Figs. 1 and 2, the apparatus is in its "set" or fully cocked position, ready for the nibbling of a fish upon the hook at the end of the line 12, and is resting upon the water 11. The buoyant member 10 supports the entire device, the friction between the inner surface 34 of the tube 21 and the spherical balls 27 and 28 preventing the pipe 24 and the plunger 16 from moving downward relative to the tube 21, said pipe and plunger being effectively one piece due to the locking-pin action of the spherical balls 27 and 28. The spring 29 is in its compressed position, thus exerting an upward force on the plunger 16 relative to the pipe 24, and due to the curved nature of the spheres 27 and 28, an outward force on said spheres against the inner surface 34 of the tube 21, resulting in the friction mentioned above.

As seen in Fig. 3 a downward force has been exerted upon the plunger 16 (such as by a fish nibbling at the bait upon the hook), thus causing said plunger and the pipe 24 to move as a unit downward relative to the buoyant member 10 and its tube 21, which remain substantially at water level. The spheres 27 and 28 are pressed against the curved surface 35 (which acts as a cam) of the internal recess 22 of the tube 21 and are about to be ejected into said internal recess by the outward force exerted by the plunger against the spheres.

In Fig. 4, the spheres have been ejected from the circumferential groove 23 of the plunger 16 and are resting within the lateral holes 25 and 26 of the pipe 24 and the recess 22 of the tube 21. The locking-pin action of the spheres having ended, the plunger 16 has been released from its locked relation to the pipe 24 and has suddenly been propelled upward by the force of the spring 29, thus causing a strong jerk upon the fishing line and the hook attached thereto, thereby tending to have the desired result of hooking a fish engaged with the hook. In order to prevent the spheres from falling out of the pipe holes 25 and 26, the length of the tube 21 must be no less than the distance from said holes to the sleeve 18, since the sleeve 18 will come to rest upon the top of the tube 21.

The operation of setting the device can be understood by observing Figs. 4, 3 and 2 in that sequence. By holding the pipe 24 near the annular projection 36 and pushing it upward relative to the plunger 16, the circumferential groove 23 is brought to the position, as seen in Fig. 3, where the spheres 27 and 28, will be inserted into said groove due to the force exerted by the curved cam surface 35 of the tube 21 resting upon them. As seen in Fig. 2, the tube 21 will slip down over the spheres and thus retain them in locking-pin relation to the plunger 16 and the pipe 24 and, upon releasing the manual hold on the pipe and the plunger, the friction of the spheres against the tube 21 will maintain the setting. The projection 36 will prevent the tube's slipping too far down past the spheres.

A modified embodiment of the present invention is illustrated in Figs. 6 and 7, similar parts being identified by the same numerals, primed however. Several parts are omitted for greater clarity.

The tube 21' is provided with an encompassing buoyant member (not shown) and an annular internal recess 22' with a curved surface 35'. The plunger 16' is provided with a lateral recess 23' and a longitudinal hole 37 extending from the lower end 38 of the plunger to the lateral recess 23'. A sphere 28' rests in the lateral recess 23'. An elongated pin 39 extends through the longitudinal hole 37 to the lateral recess 23' where it is provided with a tapered or cam end. Said pin 39 is also provided with a line-holding end including a conical reduced diameter portion 20' and a ring 19'. The elongated pin 39 is movably linked to the plunger 16' by a rivet 40 through said plunger and a rivet hole 41 in the elongated pin 39. The rivet hole 41 provides sufficient clearance for the rivet 40 so that the elongated pin 39, may be inserted into or retracted from the lateral recess 23' a very slight distance. A coil spring (not shown) is connected between the plunger 16' and the tube 21' in the same manner as, in Fig. 2, in which the spring 29 is connected between the plunger 16 and the pipe 24. The fishing line (not shown) is connected in the same manner as in the previously described preferred embodiment.

The operation of the above-described modified embodiment may be explained as follows:

The tube 21' is slidably moved upward relative to the plunger 16' from the position shown in Fig. 6 until the lateral recess 23' of said plunger and the internal recess 22' of said tube 21' are opposed to each other, as in Fig. 7. Then the elongated pin 39 is pushed upward so that its tapered or cam end positively inserts the sphere 28' into the internal recess 22' in locking-pin relationship between the plunger 16' and the tube 21'. The tube and the plunger may then be released and the curved surface 35', pressing against sphere 28', will keep said pin 39 from dropping out of the lateral recess 23' because of the friction between said pin 39 and the surface of the longitudinal hole 37 and the sphere itself. A slight downward force on the fishing line will cause the elongated pin 39 to drop out of the lateral recess 23', permitting the sphere 28' to be ejected from the internal recess 22' into the lateral recess 23', thereby allowing the compressed spring to force the plunger upward, thus causing a strong jerk upon the fishing line and the hook attached thereto.

It should be noted that, in order to conserve space, Fig. 6 has been lowered approximately 1¼ inches below its proper position with respect to Fig. 7.

Numerous modifications and variations of my invention within the spirit thereof will be apparent to those skilled in the art after a careful study hereof. All such are intended to be included and comprehended herein as fully as if specifically described, illustrated and claimed herein. For instance, the annular internal recess of the tube need not have a curved surface but may have any kind of surface capable of acting as a cam, since the function of the sphere-contacting surface is to provide a lateral or horizontal component of force against the spheres whereby they may be forced into the circumferential groove of the plunger. Hence, any contacting surface or point will perform the function of providing a lateral inward force against the spheres as long as the contact is outwardly of the center of the sphere.

Another modification within the scope of this invention is the provision of only one or of a great plurality of spheres, since the locking pin action of the sphere or spheres is independent of the number thereof.

A further modification of the embodiments of this invention is the provision of any type of buoyant member, such as a cork or another form of sealed hollow chamber, having sufficient buoyancy to support the device.

The embodiments described and illustrated herein are exemplary only, and are not intended to limit the scope of this invention, which is to be interpreted in the light of the prior art and the appended claims only, with due consideration for the doctrine of equivalents.

I claim:

1. Fishing float apparatus adapted to be attached to a fishing line having a fish-hook suspended therefrom, comprising: a buoyant member; a portion of said buoyant member providing an open bottomed tube means provided with internal recess cam means; longitudinally reciprocable pipe means in slidably movable relationship with respect to the interior of said tube means and provided with lateral recess means; elongated plunger means in slidably movable telescoping relationship with respect to said pipe means and said tube means and provided with lateral recess means; spring means cooperatively arranged with respect to said plunger means and said pipe means whereby telescopically sliding movement thereof with respect to each other in a downwardly extending and elongating manner with respect to said buoyant member causes elastic deformation of said spring means; and locking-pin sphere means in selectively cooperative relationship with respect to said internal recess cam means of said tube means and said pipe and plunger lateral recess means whereby said pipe means and said plunger means may be selectively locked into and released from spring-deforming relationship with respect to each other.

2. Fishing float apparatus adapted to be attached to a fishing line having a fish-hook suspended therefrom, comprising: a buoyant member; a portion of said buoyant member providing an open bottomed tube means provided with internal recess cam means; longitudinally reciprocable pipe means in slidably movable relationship with respect to the interior of said tube means and provided with lateral recess means; elongated plunger means in slidably movable telescoping relationship with respect to said pipe means and said tube means and provided with circumferentially grooved lateral recess means; coil spring means cooperatively arranged with respect to said plunger means and said pipe means whereby telescopically sliding movement thereof with respect to each other in a downwardly extending and elongating manner with respect to said buoyant member causes elastic compression of said spring means; and locking-pin sphere means in insertive relationship with respect to said lateral recess means of said pipe means and in selectively cooperative relationship with respect to said internal recess cam means of said tube means and said lateral recess means of said plunger means whereby said plunger means may be selectively locked into and released from spring-compressing relationship with respect to said pipe means.

3. Fishing float apparatus adapted to be attached to a fishing line having a fish-hook suspended therefrom, comprising: a buoyant member; a portion of said buoyant member providing an open bottomed tube means provided with annular internal recess cam means; longitudinally reciprocable pipe means in slidably movable telescoping relationship with respect to said tube means and provided with lateral recess means; elongated plunger means in telescoping relationship with respect to said pipe means and said tube means and provided with circumferentially grooved lateral recess means; coil spring means partially encompassing said plunger means and cooperatively arranged with respect to said plunger means and said pipe means whereby telescopically sliding movement thereof with respect to each other in a downwardly extending and elongating manner with respect to said buoyant member causes elastic compression of said coil spring means; and locking-pin sphere means in insertive relationship with respect to said lateral recess means of said pipe means and in selectively cooperative relationship with respect to said internal recess cam means of said tube means and said grooved lateral recess means of said plunger whereby relative telescopic movement of said tube means and said pipe means in one manner causes said internal recess means of said tube means to force said locking-pin sphere means into locking relationship in the pipe and plunger lateral recess means when they are aligned whereby said plunger means may be selectively locked into and released from spring-compressing relationship with respect to said pipe means.

4. Fishing float apparatus adapted to be attached to a fishing line having a fish-hook suspended therefrom, comprising: a buoyant member; a portion of said buoyant member providing an open bottomed tube means provided with annular internal recess cam means; longitudinally reciprocable pipe means in slidably movable relationship with respect to the interior of said tube means and provided with a plurality of lateral recess means; elongated plunger means in telescoping relationship with respect to said pipe means and said tube means and provided with circumferentially grooved lateral recess means; coil spring means partially encompassing said plunger means and cooperatively arranged with respect to said plunger means and said pipe means whereby telescopically sliding movement of said pipe means and said plunger means with respect to each other in a downwardly extending and elongating manner with respect to said buoyant member causes elastic deformation of said coil spring means; and a plurality of locking-pin spheres in insertive relationship with respect to said lateral recess means of said pipe means and selectively insertable relationship with respect to said grooved lateral recess of said plunger means when forced thereinto by relative telescopic actuation of said internal recess cam means of said tube means whereby said plunger means may be selectively locked into and released from spring-deforming relationship with respect to said pipe means.

5. Fishing float apparatus adapted to be attached to a fishing line having a fish-hook suspended therefrom, comprising: a buoyant member; a portion of said buoyant member providing an open bottomed tube means provided with an annular internal recess and also provided with an internal cam; longitudinally reciprocable pipe means in slidably movable telescoping relationship with respect to the interior of said tube means and provided with a plurality of circular lateral holes; elongated plunger means in telescoping relationship with respect to said pipe means and said tube means and provided with a circumferentially grooved lateral recess; coil spring means partially encompassing said plunger means and cooperatively attached to said pipe means and said plunger means whereby telescopically sliding movement of said plunger means and said pipe means with respect to each other in a downwardly extending and elongating manner with respect to said buoyant member causes elastic compression of said coil spring means; and a plurality of locking-pin spheres in insertive relationship with respect to said plurality of circular lateral holes of said pipe means and in selectively insertable relationship with respect to said circumferentially grooved lateral recess in said plunger means when forced thereinto by relative telescopic actuation of said internal cam of said tube means into opposition with respect to said lateral holes in said pipe means whereby said plunger means may be selectively locked into spring-compressing relationship with respect to said pipe means, and whereby said plunger means may be selectively released from spring-compressing relationship with respect to said pipe means by slidable opposition of said annular internal recess of said tube means with respect to said lateral holes.

References Cited in the file of this patent
UNITED STATES PATENTS 2,530,007    Euzent _____ Nov. 14, 1950

FOREIGN PATENTS 763,268    France _____ 1934